(12) United States Patent
Lian et al.

(10) Patent No.: US 12,731,825 B2
(45) Date of Patent: Sep. 8, 2026

(54) BATTERY SELF-HEATING DEVICE AND METHOD, AND VEHICLE

(71) Applicant: BYD COMPANY LIMITED, Shenzhen (CN)

(72) Inventors: Yubo Lian, Shenzhen (CN); Heping Ling, Shenzhen (CN); Lei Yan, Shenzhen (CN); Gan Song, Shenzhen (CN); Wen Gao, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/922,555

(22) Filed: Oct. 22, 2024

(65) Prior Publication Data

US 2025/0046906 A1 Feb. 6, 2025

Related U.S. Application Data

(63) Continuation of application No. PCT/CN2023/084895, filed on Mar. 29, 2023.

(30) Foreign Application Priority Data

Apr. 29, 2022 (CN) ......................... 202210474898.0

(51) Int. Cl.
*H01M 10/615* (2014.01)
*B60L 53/24* (2019.01)
(Continued)

(52) U.S. Cl.
CPC ........... *H01M 10/637* (2015.04); *B60L 53/24* (2019.02); *B60L 58/27* (2019.02); *H01M 10/615* (2015.04);
(Continued)

(58) Field of Classification Search
CPC ............. H01M 10/637; H01M 10/615; H01M 10/625; H01M 2220/20; B60L 53/24; B60L 58/27; H02J 7/14
See application file for complete search history.

(56) References Cited

U.S. PATENT DOCUMENTS 12,126,197 B2 * 10/2024 Park .......................... H02J 7/02
2020/0381784 A1 * 12/2020 Yamamoto ........ H02J 7/007194
(Continued)

FOREIGN PATENT DOCUMENTS

CN 105762434 A 7/2016
CN 107994299 A 5/2018
(Continued)

OTHER PUBLICATIONS

The World Intellectual Property Organization (WIPO) International Search Report for PCT/CN2023/084895 Jul. 7, 2023 6 Pages (including translation).

*Primary Examiner* — Menatoallah Youssef
*Assistant Examiner* — Esayas G Yeshaw
(74) *Attorney, Agent, or Firm* — Wenye Tan

(57) ABSTRACT

A battery self-heating device, comprising: a bridge arm converter, an energy storage element, an inductor and a controller. The controller is configured to control, in a preset state, the connection and disconnection of the bridge arm converter, such that a first power battery and a second power battery are respectively charged/discharged by means of the inductor, and each form a freewheeling circuit by means of the energy storage element, so as to realize the continuous heating of the first power battery and the second power battery.

15 Claims, 4 Drawing Sheets

(51) Int. Cl.

| | |
|---|---|
| ***B60L 58/27*** | (2019.01) |
| ***H01M 10/625*** | (2014.01) |
| ***H01M 10/637*** | (2014.01) |
| ***H02J 7/14*** | (2006.01) |

(52) U.S. Cl.

CPC ............. *H01M 10/625* (2015.04); *H02J 7/14* (2013.01); *H01M 2220/20* (2013.01)

(56) References Cited

U.S. PATENT DOCUMENTS

| | | | | |
|---|---|---|---|---|
| 2021/0061113 | A1 | 3/2021 | Ellis et al. | |
| 2021/0126471 | A1* | 4/2021 | Srivastava ............ | H02J 7/0014 |
| 2023/0062270 | A1* | 3/2023 | Li ......................... | H01M 10/48 |
| 2024/0283286 | A1* | 8/2024 | Cao ......................... | H02J 9/062 |

FOREIGN PATENT DOCUMENTS

| | | | |
|---|---|---|---|
| CN | 109823234 | A | 5/2019 |
| CN | 111347936 | A | 6/2020 |
| CN | 111572408 | A | 8/2020 |
| CN | 112186307 | A | 1/2021 |
| CN | 113506934 | A | 10/2021 |
| CN | 113752875 | A | 12/2021 |
| CN | 113752911 | A | 12/2021 |
| CN | 114616122 | B | 1/2024 |
| JP | 2009142069 | A | 6/2009 |
| WO | 2021237990 | A1 | 12/2021 |

* cited by examiner

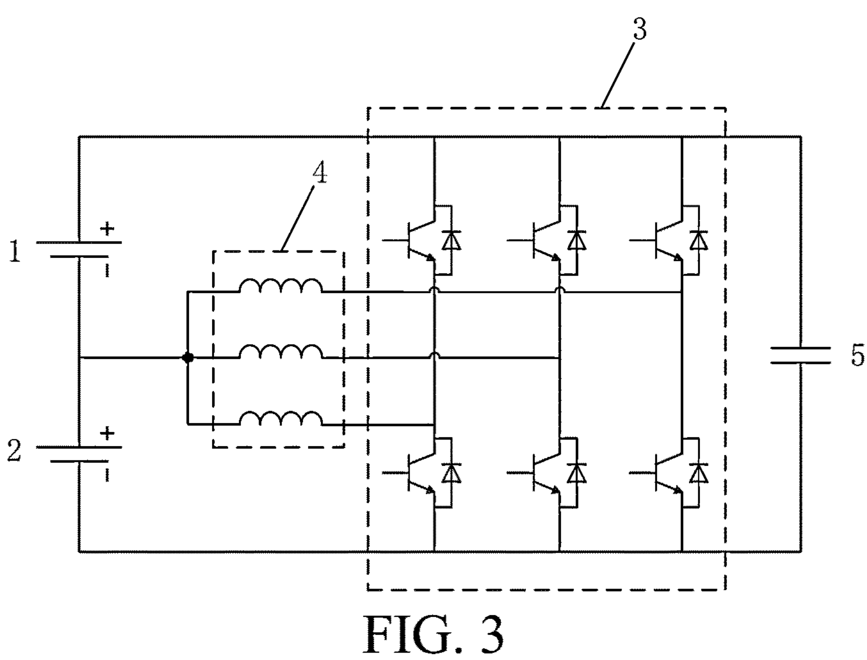
FIG. 3
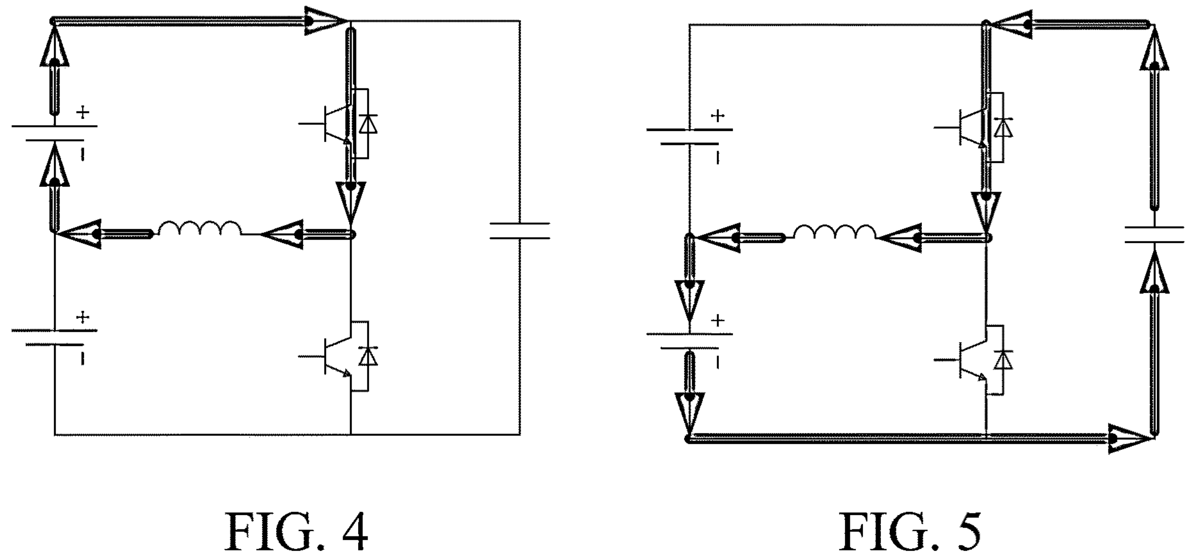
FIG. 4
FIG. 5

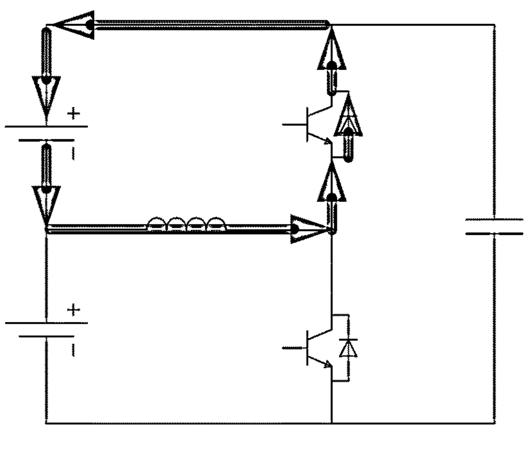

FIG. 10

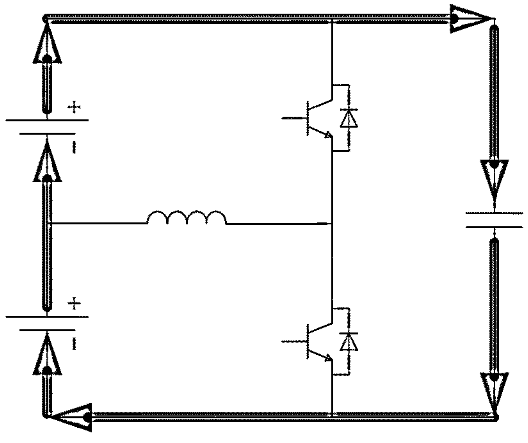

FIG. 11

Control, in a preset state, connection and disconnection of a bridge arm converter to enable a first power battery and a second power battery to be respectively charged/discharged by an inductor, and to respectively form a freewheeling circuit with an energy storage element to realize continuous heating of the first power battery and the second power battery

BATTERY SELF-HEATING DEVICE AND METHOD, AND VEHICLE

CROSS-REFERENCE TO RELATED APPLICATIONS

The present is a continuation application of PCT application No. PCT/CN2023/084895, filed on Mar. 29, 2023, which claims priority to and benefits of Chinese Patent Application No. “202210474898.0”, entitled “BATTERY SELF-HEATING DEVICE AND METHOD, AND VEHICLE” and filed on Apr. 29, 2022. The entire content of all of the above-referenced applications is incorporated herein by reference.

FIELD

The present disclosure relates to the technical field of batteries, and more specifically, to a battery self-heating device and method, and a vehicle.

BACKGROUND

In a low-temperature environment, the temperature of a lithium-ion power battery of a pure electric vehicle is too low. Due to the decrease of the activity of a positive electrode material, a negative electrode material, and an electrolyte of the battery, and the internal resistance of the battery will increase as the temperature decreases, in the low-temperature environment, the charge-discharge performance of the pure electric vehicle will significantly decrease. Therefore, the power battery of the pure electric vehicle has to be heated to increase the temperature of the body of the power battery and ensure normal use of the pure electric vehicle under cold conditions.

Existing methods for heating a power battery of an electric vehicle mainly include external heating and internal heating. The external heating is to heat the battery by adding additional heating equipment, and meanwhile, a water way, an air way, a pipeline, a low-pressure system, and the like need to be allocated, resulting in an increase of total cost. Due to long water way and pipeline, heat loss is significant, and heating time is slow and long. An internal heating principle is mainly that a battery is charge and discharge cyclically, and heat is generated relying on the internal resistance of the battery. However, in battery self-heating technologies that can be realized at present, heating power is limited, and charging and discharging of a battery pack are performed alternately, which will cause voltage fluctuations (ripples) at both ends of the battery pack.

SUMMARY

An objective of the present disclosure is to provide a battery self-heating device and method, and a vehicle.

To achieve the foregoing objective, the present disclosure provides a battery self-heating device. The device includes a bridge arm converter, an energy storage element, an inductor, and a controller. A first bus terminal of the bridge arm converter is connected to a positive electrode of a first power battery, and a second bus terminal of the bridge arm converter is connected to a negative electrode of a second power battery. A first end of the inductor is connected to a midpoint of the bridge arm converter, and a second end of the inductor is connected to a negative electrode of the first power battery and a positive electrode of the second power battery. The energy storage element is connected in parallel between the positive electrode of the first power battery and the negative electrode of the second power battery, a first end of the energy storage element is connected to the first bus terminal of the bridge arm converter, and a second end of the energy storage element is connected to the second bus terminal of the bridge arm converter. The controller is configured to control, in a preset state, connection and disconnection of the bridge arm converter to enable the first power battery and the second power battery to be respectively charged/discharged by the inductor, and to respectively form a freewheeling circuit with the energy storage element to realize continuous heating of the first power battery and the second power battery.

The present disclosure further provides a battery self-heating method. The method includes: controlling, in a preset state, connection and disconnection of a bridge arm converter to enable a first power battery and a second power battery to be respectively charged/discharged by an inductor, and to respectively form a freewheeling circuit by an energy storage element to realize continuous heating of the first power battery and the second power battery. A first bus terminal of the bridge arm converter is connected to a positive electrode of the first power battery, and a second bus terminal of the bridge arm converter is connected to a negative electrode of the second power battery. A first end of the inductor is connected to a midpoint of the bridge arm converter, and a second end of the inductor is connected to a negative electrode of the first power battery and a positive electrode of the second power battery. The energy storage element is connected in parallel between the positive electrode of the first power battery and the negative electrode of the second power battery, a first end of the energy storage element is connected to the first bus terminal of the bridge arm converter, and a second end of the energy storage element is connected to the second bus terminal of the bridge arm converter.

The present disclosure further provides a vehicle. The vehicle includes the battery self-heating device described above.

Other features and advantages of the present disclosure will be described below the following detailed description.

BRIEF DESCRIPTION OF THE DRAWINGS

Accompanying drawings are used to provide further understanding of the present disclosure, constitute a part of this specification, and are used to explain the present disclosure together with specific embodiments below, and do not constitute a limitation to the present disclosure. In the accompanying drawings:

FIG. 3 is a structural block diagram of a battery self-heating device according to another exemplary embodiment of the present disclosure.

FIG. 4 is a schematic diagram of a flow direction of an oscillation current in a first stage in a current cycle period in a battery self-heating process according to an exemplary embodiment of the present disclosure.

FIG. 5 is a schematic diagram of a flow direction of a freewheeling current in a first stage in a current cycle period in a battery self-heating process according to an exemplary embodiment of the present disclosure.

FIG. 10 is a schematic diagram of a flow direction of an oscillation current in a fourth stage in a current cycle period in a battery self-heating process according to an exemplary embodiment of the present disclosure.

FIG. 11 is a schematic diagram of a flow direction of a freewheeling current in a fourth stage in a current cycle period in a battery self-heating process according to an exemplary embodiment of the present disclosure.

FIG. 12 is a flowchart of a battery self-heating method according to an exemplary embodiment of the present disclosure.

DETAILED DESCRIPTION

Certain embodiments of the present disclosure are described in detail below with reference to accompanying drawings. It is to be understood that the specific embodiments described herein are merely used to describe and explain the present disclosure, but are not used to limit the present disclosure.

It is to be noted that, all actions for obtaining signals, information or data in the present disclosure are performed on the premise of complying with corresponding data protection regulations and policies of the country where the signals, the information or the data are located, and are performed in a case that authorization is granted by a corresponding device owner.

Figure 1:
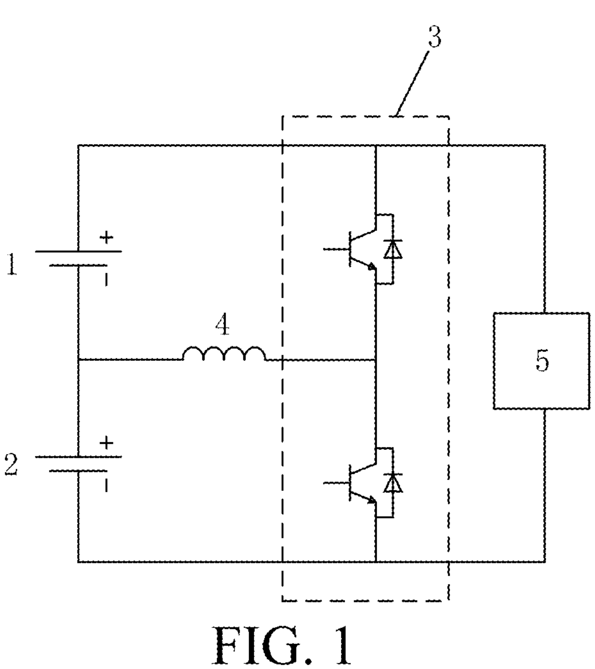
FIG. 1 is a structural block diagram of a battery self-heating device according to an exemplary embodiment of the present disclosure.

FIG. 1 is a structural block diagram of a battery self-heating device according to an exemplary embodiment of the present disclosure. As shown in FIG. 1, the device includes a bridge arm converter 3, an energy storage element 5, an inductor 4, and a controller (not shown). A first bus terminal of the bridge arm converter 3 is connected to a positive electrode of a first power battery 1, and a second bus terminal of the bridge arm converter 3 is connected to a negative electrode of a second power battery 2. A first end of the inductor 4 is connected to a midpoint of the bridge arm converter 3, and a second end of the inductor 4 is connected to a negative electrode of the first power battery 1 and a positive electrode of the second power battery 2. The energy storage element 5 is connected in parallel between the positive electrode of the first power battery 1 and the negative electrode of the second power battery 2, a first end of the energy storage element 5 is connected to the first bus terminal of the bridge arm converter 3, and a second end of the energy storage element 5 is connected to the second bus terminal of the bridge arm converter 3. The controller is configured to control, in a preset state, connection and disconnection of the bridge arm converter 3 to enable the first power battery 1 and the second power battery 2 to be respectively charged/discharged by the inductor 4, and to respectively form a freewheeling circuit with the energy storage element 5 to realize continuous heating of the first power battery 1 and the second power battery 2.

The first power battery 1 and the second power battery 2 may be power batteries in the same vehicle. The first power battery 1 and the second power battery 2 may be two power batteries arranged separately, or may be two parts of a power battery obtained by segmenting an original power battery in a vehicle. For example, a midpoint of an original power battery in a vehicle may be led out to segment the power battery in the vehicle into the first power battery 1 and the second power battery 2. The bridge arm converter 3 may be a bridge arm converter 3 in a motor controller in the vehicle. The inductor 4 may be an inductor 4 in a motor controlled by the motor controller in the vehicle. The controller may be a controller in any form, which may be a controller arranged separately, or may be a control module integrated in a Vehicle Control Unit (VCU) or the like.

The preset state may be a state that the first power battery 1 and the second power battery 2 need to be heated, for example, electric quantities of the first power battery 1 and the second power battery 2 are lower than a preset electric quantity threshold, or temperatures of the first power battery 1 and the second power battery 2 are lower than a preset temperature threshold.

The controller controls connection and disconnection of the bridge arm converter 3 in the preset state, such that an oscillation current is generated by each of the first power battery 1 and the second power battery 2 by the inductor 4, and the first power battery 1 and the second power battery 2 are respectively charged/discharged by the inductor 4 to realize heating of the first power battery 1 and the second power battery 2. Thus, self-heating of the power battery can be realized without additional heating equipment, and the first power battery 1 and the second power battery 2 can respectively generate an oscillation current by the inductor 4 to charge and discharge, that is, when the first power battery 1 is discharged, the second power battery 2 is charged; and when the second power battery 2 is discharged, the first power battery 1 is charged. Therefore, a total voltage of the first power battery 1 and the second power battery 2 can be ensured to be relatively stable and unchanged, so that battery ripples in a battery self-heating process can be reduced, and electrical safety in the vehicle can be ensured.

In addition, the energy storage element 5 is connected in parallel between the first power battery 1 and the second power battery 2, so that currents in the first power battery 1 and the second power battery 2 will not be interrupted in any state that the first power battery 1 is charged/discharged and the second power battery 2 is charged/discharged, and the heating of the first power battery 1 and the second power battery 2 is continuous, thereby further ensuring self-heating efficiency of the battery, and preventing a harmonic hazard due to an interrupted current in the battery.

Through the foregoing technical solution, a battery self-heating device that provides freewheeling capacity by using an energy storage element is provided. Two power batteries are provided, and an energy storage element is provided for freewheeling to generate an oscillation current between each of the two power batteries and an inductor to realize low-cost and high-efficient battery self-heating, and the stability of the total voltage of the two power batteries and the continuous flow of current in the batteries can also be ensured, thereby ensuring the safety of the batteries during a self-heating process.

Figure 2:
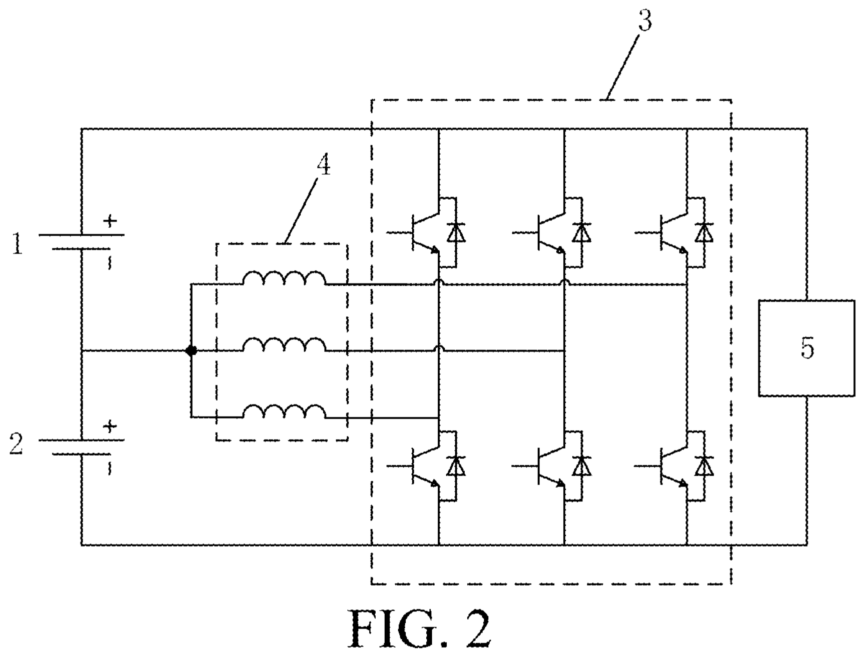
FIG. 2 is a structural block diagram of a battery self-heating device according to another exemplary embodiment of the present disclosure.

In an embodiment, the bridge arm converter 3 may include one phase of bridge arm or multiple phases of bridge arms. In the present disclosure, the number of phases in the bridge arm converter 3 is not limited, and may be specifically determined according to the bridge arm converter actually applied to a motor controller of a vehicle. There may be one or more inductors 4, which may be specifically determined according to the number of phases of the bridge arm converter 3. For example, the bridge arm converter 3 may include three phases of bridge arms, and there may be three inductors 4, specifically as shown in FIG. 2, which shows a schematic diagram of a battery self-heating device including a converter including three phases of bridge arms and three inductors 4 corresponding to the three phases of bridge arms. First ends of the inductors 4 are respectively connected to midpoints of the three phases of bridge arms. Second ends of the inductors 4 are connected to a negative electrode of the first power battery 1 and a positive electrode of the second power battery 2 after being connected together.

In a common circuit including a motor, at any time, the currents flowing through the inductors 4 in the motor have different directions to ensure that a total current entering a neutral point of the motor is equal to a total current flowing out of the neutral point of the motor, for example, one phase in and one phase out, or one phase in and two phases out, or one phase out and two phases inlet. Therefore, a maximum current flowing through a conventional motor can only be a limited current of one phase inductor 4. However, in the schematic diagram of the battery self-heating device according to the present disclosure shown in FIG. 2, in a case that the bridge arm converter 3 includes three phases of bridge arms and three inductors 4 respectively connected to three midpoints of the three phases of bridge arms, the inductors 4 can be led out through second ends of the inductors 4 connected to the negative electrode of the first power battery 1 and the positive electrode of the second power battery 2, so that three phases of currents in the inductors 4 may be in the same direction. Therefore, the magnitudes of the currents that can flow through the inductors 4 are significantly increased, and the maximum current flowing capacity of the motor where the inductors 4 are located can be fully played. The higher the current, the more heat generated in the first power battery 1 and the second power battery 2, so the battery self-heating efficiency achieved by this embodiment can be further improved.

Moreover, in the battery self-heating device, as shown in FIG. 2, where the bridge arm converter 3 includes the three phases of bridge arms and the three inductors 4 respectively connected with the midpoints of the three phases of bridge arms, if the currents in the three inductors 4 are the same, the magnitudes of the currents in the three inductors 4 are equal. A real-time electromagnetic force synthesized in a motor where the inductors 4 are located is zero, thereby realizing zero torque output and ensuring that the motor remains stationary in a self-heating process without any additional torque control.

In an embodiment, as shown in FIG. 3, the energy storage element 5 may be a capacitor.

Figure 6:
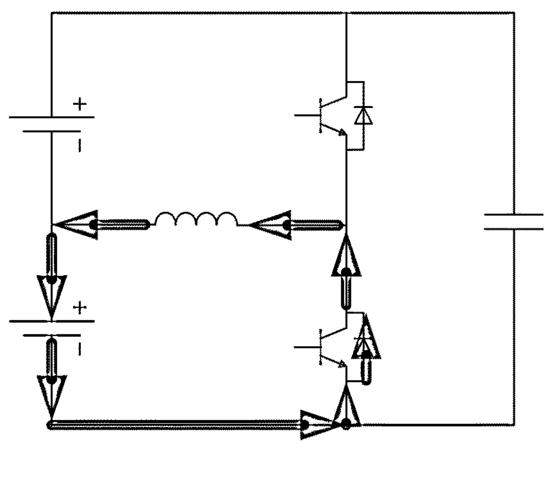
FIG. 6 is a schematic diagram of a flow direction of an oscillation current in a second stage in a current cycle period in a battery self-heating process according to an exemplary embodiment of the present disclosure.
Figure 7:
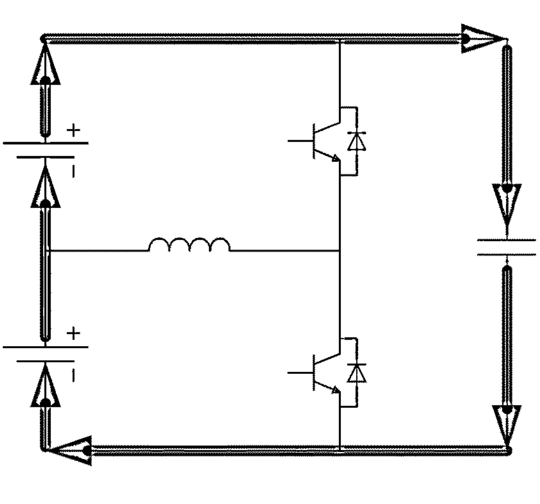
FIG. 7 is a schematic diagram of a flow direction of a freewheeling current in a second stage in a current cycle period in a battery self-heating process according to an exemplary embodiment of the present disclosure.

In an embodiment, when one of the first power battery 1 and the second power battery 2 is charged/discharged by the inductor 4 (as shown in FIG. 4, FIG. 6, FIG. 8, and FIG. 10), the other of the first power battery 1 and the second power battery 2 form a freewheeling circuit with the energy storage element 5 (as shown in FIG. 5, FIG. 7, FIG. 9, and FIG. 11, those skilled in the art are to be understood that the freewheeling circuit may further include other elements, for example the inductor 4 in FIG. 5 and another power battery in FIG. 7, which will not be repeated here).

Moreover, a current flow direction when one of the first power battery 1 and the second power battery 2 is charged/discharged by the inductor 4 is as first direction (as shown in FIG. 4, FIG. 6, FIG. 8, and FIG. 10), a freewheeling current flow direction of the other of the first power battery 1 and the second power battery 2 is a second direction (as shown in FIG. 5, FIG. 7, FIG. 9, and FIG. 11), and the first direction is opposite to the second direction.

In an embodiment, the controller is configured to control, in the preset state, alternating connection and disconnection of an upper bridge arm and a lower bridge arm of the bridge arm converter 3 to enable the first power battery 1 and the second power battery 2 to be respectively charged/discharged by the inductor 4, and to respectively form a freewheeling circuit with the energy storage element 5 to realize continuous heating of the first power battery 1 and the second power battery 2. A specific alternating connection and disconnection manner may be shown in FIG. 4 to FIG. 11. Reference signs of various devices in FIG. 4 to FIG. 11 are not shown and may be referred to the reference signs of various devices in FIG. 1 to FIG. 3.

FIG. 4 to FIG. 11 are respectively schematic diagrams of current flow directions of four stages in a current cycle period in a battery self-heating process according to an exemplary embodiment of the present disclosure.

First stage: the upper bridge arm of the bridge arm converter 3 is controlled to be connected, the lower bridge arm is controlled to be disconnected, the first power battery 1 is discharged, the energy storage element 5 is discharged, the second power battery 2 is charged, and the inductor 4 is charged. A flow direction of an oscillation current for self-heating the battery is shown in FIG. 4. The current flows out from the positive electrode of the first power battery 1, and flows through the upper bridge arm of the bridge arm converter 3 and the inductor 4 and flows back to the negative electrode of the first power battery 1. The first power battery 1 discharges to the inductor 4. A flow direction of a freewheeling current is shown in FIG. 5. The current flows out from the positive electrode of the energy storage element 5, and flows through the upper bridge arm of the bridge arm converter 3, the inductor 4, and the second power battery 2 and flows back to the negative electrode of the energy storage element 5. The second power battery 2 is charged.

It is to be noted that, a discharging process shown in FIG. 4 and a freewheeling current charging process shown in FIG. 5 are performed simultaneously. Therefore, in the first stage, there are currents flowing through the first power battery 1 and the second power battery 2 simultaneously, and simultaneous self-heating is realized. Moreover, current directions of the first power battery 1 and the second power battery 2 are opposite. Changes of terminal voltages of the first power battery 1 and the second power battery 2 may cancel each other out. An overall terminal voltage fluctuation of a battery pack is small, which can reduce ripples of the battery pack.

Second stage: the upper bridge arm of the bridge arm converter 3 is controlled to be disconnected, the lower bridge arm is controlled to be connected, the first power battery 1 is discharged, the inductor 4 is discharged, the second power battery 2 is charged, and the energy storage element 5 is charged. A flow direction of an oscillation current for self-heating the battery is shown in FIG. 6. The current flows out from the inductor 4 to the positive electrode of the second power battery 2, flows out from the negative electrode of the second power battery 2, flows through the lower bridge arm of the bridge arm converter 3 and flows back to the inductor 4. The second power battery 2 is charged by the inductor 4. A flow direction of a freewheeling current is shown in FIG. 7. The first power battery 1 is connected in series with the second power battery 2. The current flows out from the positive electrode of the first power battery 1, flows through the energy storage element 5 and flows back to the negative electrode of the second battery power 2. The first power battery 1 and the second power battery 2 discharge to the energy storage element 5 together.

It is to be noted that, a charging process shown in FIG. 6 and a freewheeling current discharging process shown in FIG. 7 are performed simultaneously. Therefore, in the first stage, there are currents flowing through the first power battery 1 and the second power battery 2 simultaneously, and simultaneous self-heating is realized. Moreover, current directions of the first power battery 1 and the second power battery 2 are opposite. Changes of terminal voltages of the first power battery 1 and the second power battery 2 may cancel each other out. An overall terminal voltage fluctuation of a battery pack is small, which can reduce ripples of the battery pack.

Figure 8:
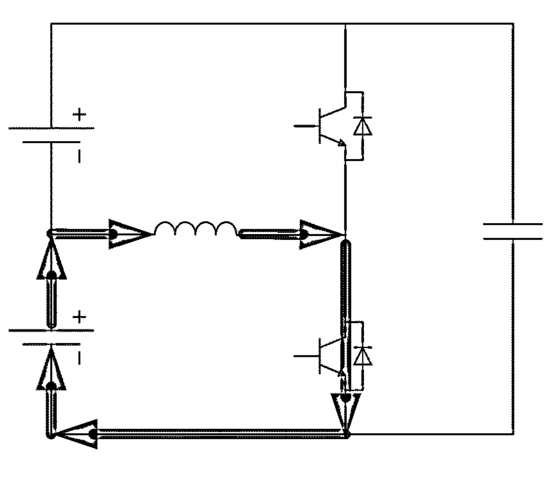
FIG. 8 is a schematic diagram of a flow direction of an oscillation current in a third stage in a current cycle period in a battery self-heating process according to an exemplary embodiment of the present disclosure.
Figure 9:
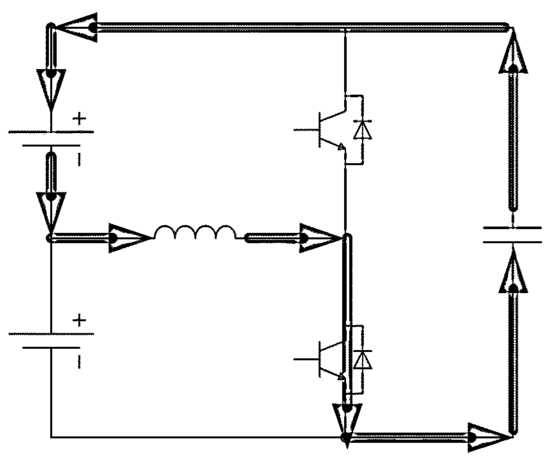
FIG. 9 is a schematic diagram of a flow direction of a freewheeling current in a third stage in a current cycle period in a battery self-heating process according to an exemplary embodiment of the present disclosure.

Third stage: the upper bridge arm of the bridge arm converter 3 is remained disconnected, and the lower bridge arm is connected. The first power battery 1 is charged, the inductor 4 is charged, the second power battery 2 is discharged, and the energy storage element 5 is discharged. A flow direction of an oscillation current for self-heating the battery is shown in FIG. 8. The current flows out from the positive electrode of the second power battery 2, flows through the inductor 4 and the lower bridge arm of the bridge arm converter 3 and flows back to the second power battery 2. The second power battery 2 discharges to the inductor 4. A flow direction of a freewheeling current is shown in FIG. 9. The current flows out from the positive electrode of the energy storage element 5, flows through the first power battery 1, the inductor 4, and the lower bridge arm of the bridge arm converter 3 and flows back to the negative electrode of the energy storage element 5. The first power battery 1 is charged.

It is to be noted that, a discharging process shown in FIG. 8 and a freewheeling current charging process shown in FIG. 9 are performed simultaneously. Therefore, in the first stage, there are currents flowing through the first power battery 1 and the second power battery 2 simultaneously, and simultaneous self-heating is realized. Moreover, current directions of the first power battery 1 and the second power battery 2 are opposite. Changes of terminal voltages of the first power battery 1 and the second power battery 2 may cancel each other out. An overall terminal voltage fluctuation of a battery pack is small, which can reduce ripples of the battery pack.

Fourth stage: the upper bridge arm of the bridge arm converter 3 is controlled to be connected, and the lower bridge arm is controlled to be disconnected. The first power battery 1 is charged, the energy storage element 5 is charged, the second power battery 2 is discharged, and the inductor 4 is discharged. A flow direction of an oscillation current for self-heating the battery is shown in FIG. 10. The current flows out from the inductor 4, and flows through the upper bridge arm of the bridge arm converter 3, flows to the positive electrode of the first power battery 1, flows out from the negative electrode of the first power battery 1 and flows back to the inductor 4. The first power battery 1 is charged by the inductor 4. A flow direction of a freewheeling current is shown in FIG. 11. The first power battery 1 is connected in series with the second power battery 2. The current flows out from the positive electrode of the first power battery 1, flows through the energy storage element 5 and flows back to the negative electrode of the second battery power 2. The first power battery 1 and the second power battery 2 discharge to the energy storage element 5 together.

It is to be noted that, a charging process shown in FIG. 10 and a freewheeling current discharging process shown in FIG. 11 are performed simultaneously. Therefore, in the first stage, there are currents flowing through the first power battery 1 and the second power battery 2 simultaneously, and simultaneous self-heating is realized. Moreover, current directions of the first power battery 1 and the second power battery 2 are opposite. Changes of terminal voltages of the first power battery 1 and the second power battery 2 may cancel each other out. An overall terminal voltage fluctuation of a battery pack is small, which can reduce ripples of the battery pack.

In an embodiment, the controller is configured to control, in the preset state, alternating connection and disconnection of the upper bridge arm and the lower bridge arm of the bridge arm converter 3 according to a preset duty cycle allocation setting. Thus, the controller may accurately determine a time for switching connected and disconnected states of the upper bridge arm and the lower bridge arm according to the preset duty cycle allocation setting to switch from the stage shown in FIG. 4 and FIG. 5 to the stage shown in FIG. 6 and FIG. 7 and switch from the stage shown in FIG. 8 and FIG. 9 to the stage shown in FIG. 10 and FIG. 11 to control accurately.

Specifically, as an example in which the upper bridge arm and the lower bridge arm of the bridge arm converter 3 are controlled to be connected and disconnected alternately according to the preset duty cycle allocation setting, the controller may be configured to control, in the preset state, the upper bridge arm of the bridge arm converter 3 to be disconnected and the lower bridge arm of the bridge arm converter 3 to be connected when the upper bridge arm of the bridge arm converter 3 is in a connected state, the lower bridge arm of the bridge arm converter 3 is in a disconnected state, and duration that the upper bridge arm of the bridge arm converter 3 is in the connected state reaches first preset duration in the preset duty cycle allocation setting. For example, the stage shown in FIG. 4 and FIG. 5 is switched to the stage shown in FIG. 6 and FIG. 7. The upper bridge arm of the bridge arm converter 3 is controlled to be connected and the lower bridge arm of the bridge arm converter 3 is controlled to be disconnected when the lower bridge arm of the bridge arm converter 3 is in a connected state, the upper bridge arm of the bridge arm converter 3 is in a disconnected state, and duration that the lower bridge arm of the bridge arm converter 3 reaches second preset duration in the preset duty cycle allocation setting. For example, the stage shown in FIG. 8 and FIG. 9 is switched to the stage shown in FIG. 10 and FIG. 11.

Both the first preset duration and the second preset duration in the preset duty cycle allocation setting may be determined empirical data, or may be calibrated in advance according to experimental data, or may be determined according to a formula. The formula may characterize a correspondence between various thresholds and environmental information. When the environmental information changes, various thresholds may change correspondingly. The environmental information may include, for example, battery usage duration, State of Charge (SOC) information, a battery temperature, and an ambient temperature.

In addition, when the upper bridge arm of the bridge arm converter 3 is in the connected state, the inductor 4 is switched from releasing energy to the first power battery 1 to receiving energy of the first power battery 1 and the energy storage element 5, and the energy storage element 5 is switched from receiving the energy of the first power battery 1 and the second power battery 2 to releasing energy to the second power battery 2 and the inductor 4 according to a connection time of the upper bridge arm of the bridge arm converter 3. For example, the stage shown in FIG. 10 and FIG. 11 is switched to the stage shown in FIG. 4 and FIG. 5.

When the lower bridge arm of the bridge arm converter 3 is in the connected state, the inductor 4 is switched from releasing energy to the second power battery 2 to receiving energy of the second power battery 2 and the energy storage element 5, and the energy storage element 5 is switched from receiving the energy of the first power battery 1 and the second power battery 2 to releasing energy to the first power battery 1 and the inductor 4 according to a connection time of the lower bridge arm of the bridge arm converter 3. For example, the stage shown in FIG. 6 and FIG. 7 is switched to the stage shown in FIG. 8 and FIG. 9.

Further, to ensure continuous flow of a freewheeling current, first duration that the inductor 4 receives the energy of the first power battery 1 and the energy storage element 5 is greater than second duration that the inductor 4 releases the energy to the second power battery 2 when the preset duty cycle allocation setting is determined. For example, the duration in the stage shown in FIG. 4 and FIG. 5 is greater than the duration in the stage shown in FIG. 6 and FIG. 7. Third duration that the inductor 4 receives the energy of the second power battery 2 and the energy storage element 5 is ensured to be greater than fourth duration that the inductor 4 releases the energy to the first power battery 1. For example, the duration in the stage shown in FIG. 8 and FIG. 9 is greater than the duration in the stage shown in FIG. 10 and FIG. 11.

In an embodiment, the controller is further configured to obtain, in the preset state, a current value of the inductor 4 and/or a voltage value at both ends of the inductor 4, and control alternating connection and disconnection of the upper bridge arm and the lower bridge arm of the bridge arm converter 3 according to the current value and/or the voltage value. Thresholds of the current value and/or the voltage current may alternatively be determined according to empirical data, or may be calibrated in advance according to experimental data.

FIG. 12 is a flowchart of a battery self-heating method according to an exemplary embodiment of the present disclosure. As shown in FIG. 12, the method may include step 101.

In 101, in a preset state, connection and disconnection of a bridge arm converter 3 are controlled to enable a first power battery 1 and a second power battery 2 to be respectively charged/discharged by an inductor 4, and to respectively form a freewheeling circuit by an energy storage element 5 to realize continuous heating of the first power battery 1 and the second power battery 2.

A first bus terminal of the bridge arm converter 3 is connected to a positive electrode of the first power battery 1, and a second bus terminal of the bridge arm converter 3 is connected to a negative electrode of the second power battery 2. A first end of the inductor 4 is connected to a midpoint of the bridge arm converter 3, and a second end of the inductor 4 is connected to a negative electrode of the first power battery 1 and a positive electrode of the second power battery 2. The energy storage element 5 is connected in parallel between the positive electrode of the first power battery 1 and the negative electrode of the second power battery 2, a first end of the energy storage element 5 is connected to the first bus terminal of the bridge arm converter 3, and a second end of the energy storage element 5 is connected to the second bus terminal of the bridge arm converter 3.

Through the foregoing technical solution, a battery self-heating device that provides freewheeling capacity by using an energy storage element is provided. Two power batteries are provided, and an energy storage element is provided for freewheeling to generate an oscillation current between each of the two power batteries and an inductor to realize low-cost and high-efficient battery self-heating, and the stability of the total voltage of the two power batteries and the continuous flow of current in the batteries can also be ensured, thereby ensuring the safety of the batteries during a self-heating process.

In an embodiment, when one of the first power battery and the second power battery is charged/discharged by the inductor, the other of the first power battery and the second power battery form a freewheeling circuit with the energy storage element.

In an embodiment, a current flow direction when one of the first power battery and the second power battery is charged/discharged by the inductor is a first direction, a freewheeling current flow direction of the other of the first power battery and the second power battery is a second direction, and the first direction is opposite to the second direction.

In an embodiment, the method further includes: in the preset state, alternating connection and disconnection of an upper bridge arm and a lower bridge arm of the bridge arm converter 3 are controlled to enable the first power battery 1 and the second power battery 2 to be respectively charged/discharged by the inductor 4, and to respectively form a freewheeling circuit with the energy storage element 5 to realize continuous heating of the first power battery 1 and the second power battery 2.

In an embodiment, the method further includes: in the preset state, alternating connection and disconnection of the upper bridge arm and the lower bridge arm of the bridge arm converter 3 are controlled according to a preset duty cycle allocation setting.

In an embodiment, the method further includes: in the preset state, the upper bridge arm of the bridge arm converter 3 is controlled to be disconnected and the lower bridge arm of the bridge arm converter 3 is controlled to be connected when the upper bridge arm of the bridge arm converter 3 is in a connected state, the lower bridge arm of the bridge arm converter 3 is in a disconnected state, and duration that the upper bridge arm of the bridge arm converter 3 reaches first preset duration in the preset duty cycle allocation setting. The upper bridge arm of the bridge arm converter 3 is controlled to be connected and the lower bridge arm of the bridge arm converter 3 is controlled to be disconnected when the lower bridge arm of the bridge arm converter 3 is in a connected state, the upper bridge arm of the bridge arm converter 3 is in a disconnected state, and duration that the lower bridge arm of the bridge arm converter 3 reaches second preset duration in the preset duty cycle allocation setting.

In an embodiment, when the upper bridge arm of the bridge arm converter 3 is in the connected state, the inductor 4 is switched from releasing energy to the first power battery 1 to receiving energy of the first power battery 1 and the energy storage element 5, and the energy storage element 5 is switched from receiving the energy of the first power battery 1 and the second power battery 2 to releasing energy to the second power battery 2 and the inductor 4 according to a connection time of the upper bridge arm of the bridge arm converter 3. When the lower bridge arm of the bridge arm converter 3 is in the connected state, the inductor 4 is switched from releasing energy to the second power battery 2 to receiving energy of the second power battery 2 and the energy storage element 5, and the energy storage element 5 is switched from receiving the energy of the first power battery 1 and the second power battery 2 to releasing energy to the first power battery 1 and the inductor 4 according to a connection time of the lower bridge arm of the bridge arm converter 3.

In an embodiment, first duration that the inductor 4 receives the energy of the first power battery 1 and the energy storage element 5 is greater than second duration that the inductor 4 releases the energy to the second power battery 2. Third duration that the inductor 4 receives the energy of the second power battery 2 and the energy storage element 5 is greater than fourth duration that the inductor 4 releases the energy to the first power battery 1.

In an embodiment, the method further includes: in the preset state, a current value of the inductor 4 and/or a voltage value at both ends of the inductor 4 are obtained, and alternating connection and disconnection of the upper bridge arm and the lower bridge arm of the bridge arm converter 3 are controlled according to the current value and/or the voltage value.

In an embodiment, the inductor 4 is an inductor 4 in a driving motor of a vehicle.

In an embodiment, the energy storage element 5 includes a capacitor.

In an embodiment, the bridge arm converter 3 is a three-phase converter, and includes three phases of bridge arms.

The present disclosure further provides a vehicle. The vehicle includes the battery self-heating device described above.

For the method in the foregoing embodiments, a specific manner of each step execution operation has already been described in detail in the embodiments related to the device, and details are not described herein again.

Embodiments of the present disclosure are described in detail above with reference to the accompanying drawings. However, the present disclosure is not limited to specific details in the foregoing embodiments, a plurality of simple deformations may be made to the technical solution of the present disclosure within a range of the technical concept of the present disclosure, and these simple deformations fall within the protection scope of the present disclosure.

Additionally, it is to be noted that, various specific technical features described in the foregoing specific embodiments may be combined in any proper manner without conflict. To avoid unnecessary repetition, various possible combination manners are not described in the present disclosure.

In addition, different embodiments of the present disclosure may alternatively be arbitrarily combined without departing from the idea of the present disclosure, and these combinations are still to be regarded as content disclosed in the present disclosure.

What is claimed is:

1. A battery self-heating device, comprising a bridge arm converter, an energy storage element, an inductor and a controller, a first bus terminal of the bridge arm converter being connected to a positive electrode of a first power battery, and a second bus terminal of the bridge arm converter being connected to a negative electrode of a second power battery; a first end of the inductor being connected to a midpoint of the bridge arm converter, and a second end of the inductor being connected to a negative electrode of the first power battery and a positive electrode of the second power battery; the energy storage element being connected in parallel between the positive electrode of the first power battery and the negative electrode of the second power battery, a first end of the energy storage element being connected to the first bus terminal of the bridge arm converter, and a second end of the energy storage element being connected to the second bus terminal of the bridge arm converter; and the controller being configured to control, in a preset state, connection and disconnection of the bridge arm converter to enable the first power battery and the second power battery to be respectively charged/discharged by the inductor, and to respectively form a freewheeling circuit with the energy storage element to realize continuous heating of the first power battery and the second power battery, wherein the connection and disconnection of the bridge arm converter in the preset state is controlled to have an oscillation current generated by each of the first power battery and the second power battery with the inductor, such that when the first power battery is discharged, the second power battery is charged, and when the second power battery is discharged, the first power battery is charged, keeping a total voltage of the first power battery and the second power battery relatively unchanged so as to reduce battery ripples.

2. The device according to claim 1, wherein when one of the first power battery and the second power battery is charged/discharged by the inductor, the other of the first power battery and the second power battery form a freewheeling circuit with the energy storage element.

3. The device according to claim 2, wherein a current flow direction when one of the first power battery and the second power battery is charged/discharged by the inductor is a first direction, a freewheeling current flow direction of the other of the first power battery and the second power battery is a second direction, and the first direction is opposite to the second direction.

4. The device according to claim 1, wherein the controller is configured to control, in the preset state, alternating connection and disconnection of an upper bridge arm and a lower bridge arm of the bridge arm converter to enable the first power battery and the second power battery to be respectively charged/discharged by the inductor, and to respectively form a freewheeling circuit with the energy storage element to realize continuous heating of the first power battery and the second power battery.

5. The device according to claim 4, wherein the controller is configured to control, in the preset state, alternating connection and disconnection of the upper bridge arm and the lower bridge arm of the bridge arm converter according to a preset duty cycle allocation setting.

6. The device according to claim 5, wherein the controller is configured to: in the preset state, control the upper bridge arm of the bridge arm converter to be disconnected and the lower bridge arm of the bridge arm converter to be connected when the upper bridge arm of the bridge arm converter is in a connected state, the lower bridge arm of the bridge arm converter is in a disconnected state, and duration that the upper bridge arm of the bridge arm converter reaches first preset duration in the preset duty cycle allocation setting; and control the upper bridge arm of the bridge arm converter to be connected and the lower bridge arm of the bridge arm converter to be disconnected when the lower bridge arm of the bridge arm converter is in a connected state, the upper bridge arm of the bridge arm converter is in a disconnected state, and duration that the lower bridge arm of the bridge arm converter reaches second preset duration in the preset duty cycle allocation setting.

7. The device according to claim 6, wherein when the upper bridge arm of the bridge arm converter is in the connected state, the inductor is switched from releasing energy to the first power battery to receiving energy of the first power battery and the energy storage element, and the energy storage element is switched from receiving the energy of the first power battery and the second power battery to releasing energy to the second power battery and the inductor according to a connection time of the upper bridge arm of the bridge arm converter; and when the lower bridge arm of the bridge arm converter is in the connected state, the inductor is switched from releasing energy to the second power battery to receiving energy of the second power battery and the energy storage element, and the energy storage element is switched from receiving energy of the first power battery and the second power battery to releasing energy to the first power battery and the inductor according to a connection time of the lower bridge arm of the bridge arm converter.

8. The device according to claim 7, wherein first duration that the inductor receives the energy of the first power battery and the energy storage element is greater than second duration that the inductor releases the energy to the second power battery; and third duration that the inductor receives the energy of the second power battery and the energy storage element is greater than fourth duration that the inductor releases the energy to the first power battery.

9. A battery self-heating device, comprising a bridge arm converter, an energy storage element, an inductor and a controller, a first bus terminal of the bridge arm converter being connected to a positive electrode of a first power battery, and a second bus terminal of the bridge arm converter being connected to a negative electrode of a second power battery; a first end of the inductor being connected to a midpoint of the bridge arm converter, and a second end of the inductor being connected to a negative electrode of the first power battery and a positive electrode of the second power battery; the energy storage element being connected in parallel between the positive electrode of the first power battery and the negative electrode of the second power battery, a first end of the energy storage element being connected to the first bus terminal of the bridge arm converter, and a second end of the energy storage element being connected to the second bus terminal of the bridge arm converter; and the controller being configured to control, in a preset state, connection and disconnection of the bridge arm converter to enable the first power battery and the second power battery to be respectively charged/discharged by the inductor, and to respectively form a freewheeling circuit with the energy storage element to realize continuous heating of the first power battery and the second power battery, wherein the controller is further configured to control, in the preset state, various elements in the device to be in the following four states cyclically:

state one: the upper bridge arm of the bridge arm converter is connected, the lower bridge arm of the bridge arm converter is disconnected, the first power battery is discharged, the energy storage element is discharged, the second power battery is charged, and the inductor is charged, wherein the device comprises a discharge current and a freewheeling current, the discharge current flows out from the positive electrode of the first power battery, flows through the upper bridge arm of the bridge arm converter and the inductor and flows back to the negative electrode of the first power battery, and the first power battery discharges to the inductor; and the freewheeling current flows out from a positive electrode of the energy storage element, flows through the upper bridge arm of the bridge arm converter, the inductor, and the second power battery and flows back to a negative electrode of the energy storage element, and the second power battery is charged by the energy storage element;

state two: the upper bridge arm of the bridge arm converter is disconnected, the lower bridge arm of the bridge arm converter is connected, the first power battery is discharged, the inductor is discharged, the second power battery is charged, and the energy storage element is charged, wherein the device comprises a charge current and a freewheeling current, the charge current flows from the inductor to the positive electrode of the second power battery, flows out from the negative electrode of the second power battery, flows through the lower bridge arm of the bridge arm converter and flows back to the inductor, and the second power battery is charged by the inductor; and the freewheeling current flows out from the positive electrode of the first power battery, flows through the energy storage element and flows back to the negative electrode of the second power battery, the first power battery is connected in series with the second power battery, and the first power battery and the second power battery discharge to the energy storage element together;

state three: the upper bridge arm of the bridge arm converter is disconnected, the lower bridge arm of the bridge arm converter is connected, the first power battery is charged, the inductor is charged, the second power battery is discharged, and the energy storage element is discharged, wherein the device comprises a discharge current and a freewheeling current, the discharge current flows out from the positive electrode of the second power battery, flows through the inductor and the lower bridge arm of the bridge arm converter and flows back to the second power battery, and the second power battery discharges to the inductor; and the freewheeling current flows out from the positive electrode of the energy storage element, flows through the first power battery, the inductor, and the lower bridge arm of the bridge arm converter and flows back to the negative electrode of the energy storage element, and the first power battery is charged; and state four: the upper bridge arm of the bridge arm converter is connected, the lower bridge arm of the bridge arm converter is disconnected, the first power battery is charged, the energy storage element is charged, the second power battery is discharged, and the inductor is discharged, wherein the device comprises a charge current and a freewheeling current, the charge current flows out from the inductor, flows through the upper bridge arm of the bridge arm converter, flows to the positive electrode of the first power battery, flows out from the negative electrode of the first power battery and flows back to the inductor, and the first power battery is charged by the inductor; and the freewheeling current flows out from the positive electrode of the first power battery, flows through the energy storage element and flows back to the negative electrode of the second power battery, the first power battery is connected in series with the second power battery, and the first power battery and the second power battery discharge to the energy storage element together.

10. The device according to claim 4, wherein the controller is configured to: in the preset state, obtain a current value of the inductor and/or a voltage value at both ends of the inductor, and control alternating connection and disconnection of the upper bridge arm and the lower bridge arm of the bridge arm converter according to the current value and/or the voltage value.

11. The device according to claim 1, wherein the inductor is an inductor in a driving motor of a vehicle.

12. The device according to claim 1, wherein the energy storage element comprises a capacitor.

13. The device according to claim 1, wherein the bridge arm converter is a three-phase converter, and comprises three phases of bridge arms.

14. A battery self-heating method, comprising:

controlling, in a preset state, connection and disconnection of a bridge arm converter to enable a first power battery and a second power battery to be respectively charged/discharged by an inductor, and to respectively form a freewheeling circuit by an energy storage element to realize continuous heating of the first power battery and the second power battery, wherein a first bus terminal of the bridge arm converter is connected to a positive electrode of the first power battery, and a second bus terminal of the bridge arm converter is connected to a negative electrode of the second power battery; a first end of the inductor is connected to a midpoint of the bridge arm converter, and a second end of the inductor is connected to a negative electrode of the first power battery and a positive electrode of the second power battery; and the energy storage element is connected in parallel between the positive electrode of the first power battery and the negative electrode of the second power battery, a first end of the energy storage element is connected to the first bus terminal of the bridge arm converter, and a second end of the energy storage element is connected to the second bus terminal of the bridge arm converter, wherein the connection and disconnection of the bridge arm converter in the preset state is controlled to have an oscillation current generated by each of the first power battery and the second power battery with the inductor, such that when the first power battery is discharged, the second power battery is charged, and when the second power battery is discharged, the first power battery is charged, keeping a total voltage of the first power battery and the second power battery relatively unchanged so as to reduce battery ripples.

15. A vehicle, comprising: the battery self-heating device according to claim 1.

* * * * *